United States Patent
Kasperchik et al.

(10) Patent No.: US 6,176,913 B1
(45) Date of Patent: Jan. 23, 2001

(54) INKS FOR INK-JET PRINTERS

(75) Inventors: Vladek P. Kasperchik, Corvallis; Garold E. Radke, Lebanon, both of OR (US)

(73) Assignee: Hewlett Packard Company, Palo Alto, CA (US)

( * ) Notice: Under 35 U.S.C. 154(b), the term of this patent shall be extended for 0 days.

(21) Appl. No.: 09/304,010

(22) Filed: Apr. 30, 1999

Related U.S. Application Data

(63) Continuation-in-part of application No. 09/182,826, filed on Oct. 29, 1998, now Pat. No. 6,059,868.

(51) Int. Cl.[7] ................................................. C09D 11/00
(52) U.S. Cl. ..................................... 106/31.48; 106/31.57
(58) Field of Search .............................. 106/31.27, 31.48, 106/31.57

(56) References Cited

U.S. PATENT DOCUMENTS

| | | |
|---|---|---|
| 5,085,698 | 2/1992 | Ma et al. . |
| 5,181,045 | 1/1993 | Shields et al. . |
| 5,428,383 | 6/1995 | Shields et al. . |
| 5,536,306 | 7/1996 | Johnson et al. . |
| 5,542,972 * | 8/1996 | von der Eltz et al. ........... 106/31.27 |
| 5,626,655 * | 5/1997 | Pawlowski et al. .............. 106/31.27 |
| 5,679,143 | 10/1997 | Looman . |
| 5,721,344 | 2/1998 | Baettig . |
| 5,785,743 | 7/1998 | Adamic et al. . |
| 5,824,785 | 10/1998 | Baettig et al. . |
| 5,858,075 * | 1/1999 | Deardurff et al. ................ 106/31.27 |
| 5,958,120 * | 9/1999 | Gundlach et al. ................ 106/31.27 |

FOREIGN PATENT DOCUMENTS 0863190 9/1998 (EP) .

* cited by examiner

Primary Examiner—Mark L. Bell
Assistant Examiner—Veronica F. Faison

(57) ABSTRACT

In accordance with the invention inks suitable for use in ink-jet printers and method for formulating the same are provided. More particularly, inks comprising the present dyes and buffers exhibit excellent color performance and lightfastness across a range of media. Furthermore, the inks enable good reliability in an environment having a relatively high concentration of precipitating agents. This reliability enables the use of precipitation bleed control mechanisms.

10 Claims, 2 Drawing Sheets

INKS FOR INK-JET PRINTERS

CROSS REFERENCE TO RELATED APPLICATIONS

The present application is a continuation-in-part of U.S. patent application Ser. No. 09/182826, now U.S. Pat. No. 6,059,868 entitled "Ink-Jet Inks With Improved Performance," by Kasperchik, filed Oct. 29, 1998, and assigned to the assignee of the present invention. The present application is also related to U.S. Pat. No. 6,053,969, filed herewith, entitled "Dye Set for Improved Color Quality For Ink-Jet Printers" by Lauw et al., also assigned to the assignee of the present invention.

FIELD OF INVENTION

The present invention generally relates to ink-jet printing, and in particular, to inks suitable for use on plain paper and exhibiting enhanced lightfastness.

BACKGROUND OF INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers.

The non-impact printing process of ink-jet printing involves the ejection of fine droplets of ink onto a print medium such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor.

Commercially-available thermal ink-jet printers, such as DeskJet® printers available from Hewlett-Packard Company, use inks of differing hues, namely, magenta, yellow, and cyan, and optionally black. The particular set of colorants, e.g., dyes, used to make the inks is called a "primary dye set." A spectrum of colors, e.g., secondary colors, can be generated using different combinations of the primary dye set.

Any given perceived color can be described using any one of the color spaces, such as CIELAB, and Munsell, as is well known in the art. For example, in the Munsell color space a given color is defined using three terms, Hue, Value, and Chroma. Similarly, in the CIELAB color space, a color is defined using three terms $L^*$, $a^*$, and $b^*$. $L^*$ defines the lightness of a color, and it ranges from zero (black) to 100 (white). The terms $a^*$ and $b^*$, together, define the hue and chroma characteristics of a given color. The term $a^*$ ranges from a more negative number, green, to a more positive number, red. The term $b^*$ ranges from a more negative number, blue, to a more positive number, yellow. Additional terms such as hue angle ($h°$) and chroma ($C^*$) are used to further describe a given color, wherein $$h° = \tan^{-1}(b^*/a^*) \qquad \text{Equation 1}$$

$$C^* = (a^{*2} + b^{*2})^{1/2} \qquad \text{Equation 2}$$

In the CIELAB color space, delta E ($\Delta E$) defines the difference between two colors, such as the color of the printed image as initially printed and the color after exposure to light (i.e., lightfade)—the higher the $\Delta E$ number, the more difference between the two colors.

$$\Delta E = [(L^*_2 - L^*_1)^2 + (a^*_2 - a^*_1)^2 + (b^*_2 - b^*_1)^2]^{1/2} \qquad \text{Equation 3}$$

$$\Delta E = (\Delta L^{*2} + \Delta a^{*2} + \Delta b^{*2})^{1/2} \qquad \text{Equation 4}$$

In general, a successful ink for color ink-jet printing must have the following properties: good crusting resistance, good stability, the proper viscosity, the proper surface tension, good color-to-color bleed alleviation, rapid dry time, no negative reaction with the vehicle, consumer-safety, and low strike-through. When placed into a thermal ink-jet system, the ink set must also be kogation-resistant.

In addition, the inks must be able to provide printed images having good color characteristics, such as correct hue and high chroma. While formation of colors on plain paper is required, it is also necessary that the inks be useful on other print media, such as transparency film and coated paper. Another requirement for the ink set is to provide a hard copy output that is lightfast, thus preserving the integrity of the original color information.

While some of these conditions may be met by ink vehicle design, other conditions must be met by the proper selection and combination of the colorants. The selection of the colorants becomes especially important when additional limitations are placed on the choice of the colorants because of other system requirements, such as the color-to-color bleed control mechanism.

Regardless of whether an ink is dye-based or pigment-based, ink-jet inks commonly face the challenge of color-to-color or black-to-color bleed control. The term "bleed," as used herein, is defined to be the invasion of one color into another, once the ink is deposited on the print medium, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed must be substantially reduced or eliminated such that borders between colors are clean and free from the invasion of one color into the other.

One approach used for controlling bleed between the printed images, as disclosed in U.S. Pat. No. 5,428,383 entitled "Method and apparatus for preventing color bleed in a multi-ink printing system," issued to Shields et. al., is to provide a first ink composition comprising a first colorant; and a second ink composition comprising a second colorant and a precipitating agent (e.g., inorganic salts) which will react with the first colorant in the first ink composition so that upon contact of the first ink and the second ink on the printing medium a precipitate is formed, thus preventing color bleed between the first ink composition and the second ink composition.

To take advantage of the precipitation mechanism for controlling bleed, it becomes important to have inks that can provide all the above performance requirements while maintaining reliability in the presence of precipitating agents.

Therefore, a need exists for inks that can provide the appropriate lightfastness and reliability in an environment having a relatively high concentration of precipitating agents.

DISCLOSURE OF THE INVENTION

In accordance with the invention inks suitable for use in ink-jet printers and method for using the same are provided. More particularly, inks comprising the present dyes exhibit excellent color performance and lightfastness across a range of media. Furthermore, the inks enable good reliability in an environment having a relatively high concentration of precipitating agents. This reliability enables the use of precipitation bleed control mechanisms.

All concentrations herein are in weight percent of total ink composition, unless otherwise indicated. The purity of all components is that employed in normal commercial practice for ink-jet inks.

As used herein, the term "ink" or "first ink" (without specific reference to the term "second ink"), refer to the inks of the present invention.

DETAILED DESCRIPTION OF THE INVENTION

Figure 1:
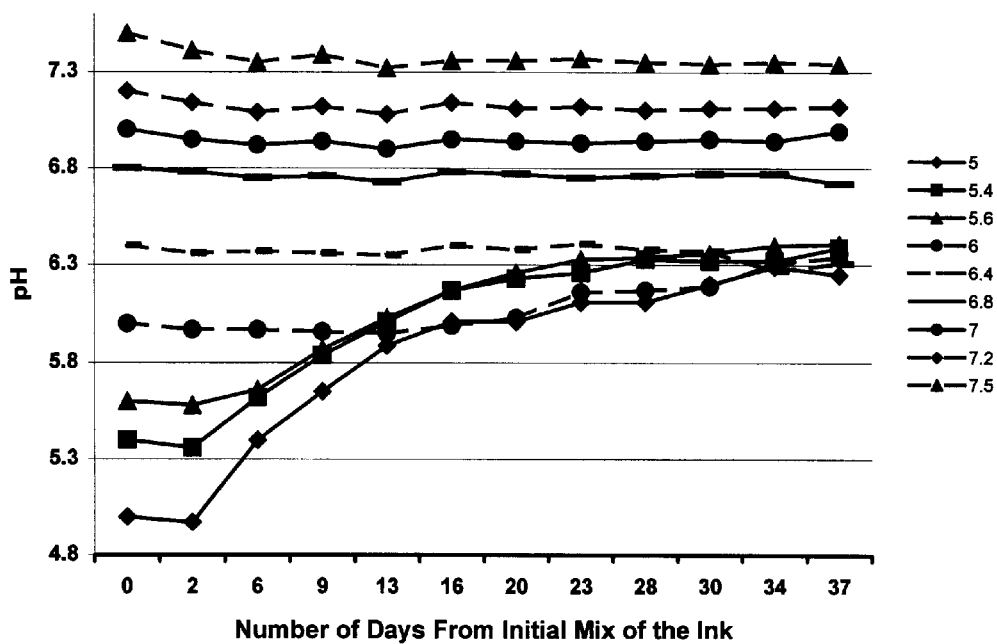
FIG. 1 is a plot of ink pH versus # of days of the ink aging at different temperatures. Upward drift of the ink pH coincides with the dye precipitation from the liquid phase.

The invention described herein is directed to inks for printing images using commercially available ink-jet printers such as DESKJET® printers, manufactured by Hewlett-Packard Company of Delaware. The inks enable an ink-jet color printer to produce high quality color images having excellent color performance and lightfastness on a range of media, particularly on plain paper. Furthermore, the inks enable good reliability, such as ink stability, in an environment having a relatively high concentration of precipitating agents such as multi-valent metal compound (e.g., metal salt or metal coordination compound).

The inks of the present invention comprise an aqueous vehicle and at least one anionic dye having at least one protonation site, preferably, a dye of Formula I, and more preferably, of Formula II; at least one organic buffer in sufficient quantity to maintain the pH of the ink at a range from about 5.5 to about 9.5; at least one precipitating agent; and optionally additional components, as described below.

As described above, the use of precipitating agents, among other forms of reactive chemistry. may be employed to enhance any one of a number of print quality attributes, such as, but not limited to: bleed control between two adjacently printed areas when one area is printed with at least the first ink and the other area is printed with at least the second ink; or when an area is printed, at least partially, with at least the first ink and at least the second ink. It should also be appreciated that the inks formulated according to the present invention, and methods using the same, can be employed in printing adjacent areas and areas that are under or over-printed with the inks employing the present invention.

In a typical application, the first ink containing the multi-valent metal may be used to bring about the immobilization of a colorant in a second ink, wherein the colorant in the second ink comprises at least one second colorant having a functional group that upon contact, for example on the print medium, with the first ink, can associate to form an insoluble salt, complex, or compound; with the precipitating agent (e.g., multi-valent metal). thereby immobilizing the second colorant in the second ink.

COLORANT

In selecting the colorant of the present invention, the following factors had to be considered: appropriate hue angle and color performance, particularly, on plain paper; good lightfastness; and compatibility (stability) in formulations having relatively high inorganic salt content.

The first criterion was lightfastness of the colorants followed by the color gamut on a wide range of media, particularly, plain paper. It was important that the colorants produce highly chromatic printed images having the appropriate hue, especially on plain paper.

In order to take advantage of the precipitation bleed control mechanism, it was necessary that the colorants were also compatible (e.g., stable in the ink vehicle and did not exhibit unwanted precipitation) in environments having relatively high concentration of precipitating agents such as multi-valent metal compounds, particularly metal salts. The colorants in the first ink had to be of a type which will not react with the precipitating agent when these two materials (i.e., colorant and precipitating agent) are formulated in the same ink. More specifically, the colorant in the first ink had to be of a type which remains soluble when formulated with the precipitating agent. This normally results when a colorant is used which does not gain its solubility mainly from carboxyl and/or carboxylate groups, and remains soluble in solutions of moderate to high ionic strength.

It was found that although some colorants were stable in the presence of precipitating agents, others which met the color performance criteria of the present invention, particularly, those of the present invention (such as those of Formula II,) did not meet the desired reliability and stability criteria. It was then, discovered, that in order to take advantage of the colorants of the present invention (such as those of Formula II) the pH of the ink had to be maintained in a certain range. Without limiting the scope of the invention, the inventors provide the following observation and discovery that inks made with anionic dyes having protonation sites (e.g., those having basic nitrogen atoms), such as those of Formula II, had to be maintained at pH levels above the range at which the protonation occurs.

The inks of the present invention, provide good color gamut on plain paper; good lightfastness; and are compatible in formulations having relatively high inorganic salt content. The inks of the present invention comprise at least one anionic dye having at least one protonation site, and more particularly, dyes of Formula I:

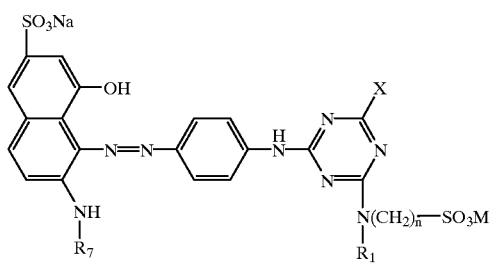

Formula I

Wherein
$R_1$ is selected from hydrogen or an aliphatic radical having from 1 to 6 atoms;

n is 2, 3, or 4;

X is $NR_3R_4$ where
$R_3$ and $R_4$ are independently selected from hydrogen; alkyl from 1 to 6 C atoms; C2 to C6 substituted alkyl where the substituents are selected from O, OCH3, COOM, SO3M; aralkyls; unsubstituted aryl or an aryl substituted by COOM or SO3M;

$R_3$ and $R_4$ may form a ring without or with inclusion of a hetero atom; or

X is $SR_5$ in which $R_5$ is alkyl from 1 to 6 C atoms; C2 to C6 substituted alkyl where the substituents are selected from OH, OCH3, COOM, SO3M; or X is $OR_4$ in which $R_6$ is hydrogen or an aliphatic radical having from 1 to 6 C atoms;

$R_7$ is hydrogen, alkyl of 1 to 6 C atoms; C2 to C6 substituted alkyl where the substituents are selected from CN, COOM, OH, $COOCH_3$, $COOCH_2CH_3$, $COCH_3$; unsubstituted aryl or aryl substituted by $CH_3$ or halogen;

M is hydrogen, a metal atom; an ammonium or ammonium substituted with alkyl, alkoxyalkyl or hydroxyl alkyl each having 1 to 12 C atoms.

The dyes of Formula I, contain no reactive groups and contain at least one protonation site.

Preferably, the dye of the present invention has Formula II:

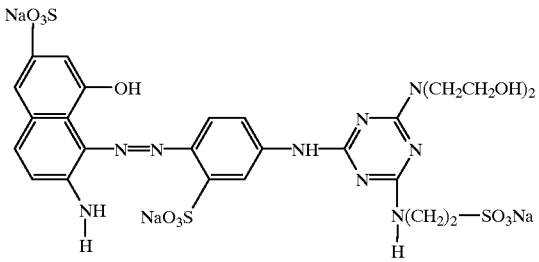

Formula II

Methods for synthesis of the dye are known in the art, as evidenced by disclosure of U.S. Pat. No. 5,824,785; and incorporated herein by reference.

The inks of the present invention comprise from about 0.05 to about 20% of at least one dye; preferably, from about 0.1 to about 8%; and more preferably, from about 0.5 to about 5%; by weight, based on the total weight of the ink. The dyes may be in their salt form, such as an alkali metal (Na, K, or Li) or quaternary ammonium. Some of these salt forms, such as Na, are commercially available. Other salt forms can be made using well known techniques. It should be further noted, that the inks may further comprise additional dyes of the same or different the dyes of the present invention.

PRECIPITATING AGENT

The precipitating agent is of a type which upon contact (for example on the print medium) reacts with the anionic group (e.g., the anionic group such as carboxyl or sulfonate) associated with a colorant (such as a dye, or a self-stabilized pigment, or the anionic group on a dispersant associated with a dispersed pigment) in an ink (i.e., second ink) composition to form an insoluble salt, complex, or compound. In a preferred embodiment, the precipitating agent will comprise of a multi-valent metal compound, such as a metal salt or metal coordination compound, preferably a metal salt. Exemplary multi-valent metal cations suitable for use in the multi-valent metal compound include the following cations listed below in Table I:

TABLE I

| Multi-valent metal cation groups | Multi-valent metal cations |
|---|---|
| Transition metals | $Cr^{+3}$, $Mn^{+2}$, $Fe^{+3}$, $Fe^{+3}$, $Co^{+3}$, $Ni^{+2}$, $Cu^{+2}$, $Zn^{+2}$, $Y^{+3}$, $Cd^{+2}$ |
| Group IIA metals | $Mg^{+2}$, $Ca^{+2}$, $Sr^{+2}$, $Ba^{+2}$ |
| Group IIIA metals | $Al^{+3}$, $Ga^{+3}$, $In^{+3}$ |
| Lanthanoid metals | $La^{+3}$, $Pr^{+3}$, $Nd^{+3}$, $Sm^{+3}$, $Eu^{+3}$, $Gd^{+2}$, $Tb^{+3}$, $Dy^{+2}$, $Ho^{+3}$, $Er^{+3}$, $Tm^{+3}$, $Yb^{+3}$, $Lu^{+3}$ |

Preferred metal cations suitable for use in the multi-valent metal compound include, but are not limited to, $Zn^{+2}$, $Mg^{+2}$, $Ca^{+2}$, $Cu^{+2}$, $Co^{+2}$, $Ni^{+2}$, $Fe^{+2}$, $La^{+3}$, $Nd^{+3}$, $Y^{+3}$, and $Al^{+3}$. Exemplary anions which may be coupled with these cations include but are limited to $NO_3^-$, $F^-$, $Cl^-$, $Br^-$, $I^-$, $CH_3COO^-$, and $SO_4^{-2}$.

Furthermore, the metal compound may be a metallic coordination compound. The metallic coordination compound generally refers to compounds in which a metallic ion is surrounded by an electron donor, i.e. ligand, which is capable of coordinating with the metallic ion. Elements composing the ligand, which are capable of coordinating with the metallic ion, are limited to the group V and VI elements in the periodic table. Typical elements are N, O, P, and S. Metallic coordination compounds containing nitrogen and oxygen atoms in the ligand are preferably used in the present invention.

The ligands composed of these elements are classified into two categories: unidentate ligands having one electron donor group per ligand or molecule, and multidentate ligands having two or more electron donor groups per ligand or molecule. Table II shows examples of ligands classified by the coordination number.

TABLE II

| Coordination Number | Ligand |
|---|---|
| 1 | Ammonia |
| 1 | Water |
| 1 | Acetic acid |
| 1 | Halogens |
| 2 | Glycine |
| 2 | Ethylenediamine |
| 2 | Propylenediamine |
| 2 | Lactic acid |
| 3 | Iminodiacetic acid |
| 3 | Diethylenetriamine |

TABLE II-continued

| Coordination Number | Ligand |
|---|---|
| 4 | Dihydroxyethylglycine |
| 4 | Hydroxyethyliminodiacetic acid |
| 4 | Nitrilotriacetic acid |
| 5 | Ethylenediaminetetraacetic acid |
| 5 | Hydroxyethylethylenediaminetetraacetic |
| 6 | Diethylenetriaminepentaacetic acid |
| 7 | Triethylenetetraminehexaacetic acid |

Among these, metallic coordination compounds having ligands of a coordination number of 2 or more are desirably used in the present invention. Preferred metallic coordination compounds have ligands of a coordination number of 3 or more. However, any other metallic coordination compound having a ligand of a coordination number of 2 or more, other than compounds shown in Table II, may also be suitably used without restriction.

Accordingly, preferred multi-valent metal salts derived from the above-described cations and anions include but are not limited to: $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $CuCl_2$, $CoCl_2$, $Co(NO_3)_2$, $NiCl_2$, $Ni(NO_3)_2$, $MgCl_2$, $MgBr_2$, $MgSO_4$, $Mg(CH_3COO)_2$, and $Mg(NO_3)_2$. It should be noted that other multi-valent metal salts derived from the above-listed cations and anions may also be prepared and used in the manner described herein. However, when selecting the appropriate multi-valent metal salt, the exercise of basic chemical techniques will dictate which compounds are most appropriate and which are not. For example, it is well known in the art that $AlCl_3$ produces a violent reaction when combined with water (e.g. the production of HCl gas). Thus, a reasonable and skilled chemist would conclude that this material would not be especially desirable for use in the present invention. Likewise, the desirability of other multi-valent metal salts or coordination compound may also be determined in this manner. It should further be noted that in certain instances, the pH of the ink may be adjusted, depending on the specific metal compound, e.g. metal salt, being used in the ink. Specifically, a side reaction may occur in which the metal cations in the ink form insoluble metal hydroxides if the pH of the ink is too high. Preliminary pilot tests with the selected ink compositions will provide an indication as to whether this situation will occur. If necessary, the side reaction may be controlled by adjusting the pH of the ink downward using a selected acid (e.g. $HNO_3$). The amount and type of pH adjusting agent, as well as the general need for pH adjustments with respect to the ink are all determined using pilot tests as noted above, in conjunction with the exercise of routine chemical procedures which are well known in the art.

In a preferred embodiment, the ink will comprise from about 0.3 to about 40% by weight multi-valent metal compound, preferably, from about 1 to about 15%, and most preferably from about 0.5 to about 5%.

BUFFER

In order to main the reliability of the ink and to minimize the precipitation of the dyes in the first ink in the presence of the precipitating agent, the pH of the ink should be maintained at a suitable range. It is believed, without any intention of limiting the scope of the invention, that the suitable buffer prevents (or minimizes the occurrence of) the dye from protonating, thus minimizing the likelihood of precipitation in environments containing precipitating agents.

The suitable buffer should be soluble in ink vehicle (e.g., aqueous/organic vehicle); should not form crystalline precipitates (or minimum precipitation) after evaporation of the aqueous part of the vehicle; and should be present in sufficient quantities to maintain the pH of the ink at a range from about 5.5 to about 9.5, and more preferably from about 6 to about 9, and most preferably from about 6.5 to 8.5.

Examples of suitable buffers include, but are not limited, to biological buffers such as:

TRIZMA BASE (Tris[hydroxymethyl]aminomethane), pH=7–9; MOPS (3-[N-morpholino]propanesulfonic acid), pH=6.5–7.9; TES (N-Tris[hydroxymethyl] methyl-2-aminoethanesulfonic acid), pH=6.5–7.9; DIPSO (3-[N,n-bis2-hydroxyethylamino]-2-hydroxypropanesulfonic acid, Na salt) pH=7.0–8.2; TAPSO (3-[N-trishydroxymethylmethylamino]-2-hydroxypropanesulfonic acid), pH=7.0–8.2; HEPPSO (N-[2-hydroxyethyl]piperazine-N'-[2-hydroxypropanesulfonic acid]), pH=7.1–8.5; POPSO (Piperazine-n,n'-bis[2-hydroxypropanesulfonic acid], pH=7.2–8.5; TRICINE (N-Tris[hydroxymethyl] methylglycine), pH=7.4–8.8; BICINE (N,N-Bis[2-hydroxyethyl]glycine), pH=7.6–9.0; TAPS (N-Tris [hydroxymethyl]methyl-3-aminopropanesulfonic acid), pH=7.7–9.1; AMPSO (3-[1,1-Dimethyl-2-hydroxyethylamino]-2-hydroxypropanesulfonic acid), pH=8.3–9.7; preferably TRIZMA BASE, due to its excellent solubility in the ink and buffering capacity per unit weight of buffer.

AQUEOUS VEHICLE

The aqueous carrier medium is water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

In the case of a mixture of water and at least one water-soluble solvent, the aqueous carrier medium usually comprises from about 30% to about 95% water. The preferred compositions are about 60% to about 95% water, based on the total weight of the aqueous carrier medium.

ADDITIONAL COMPONENTS

Consistent with the requirements for this invention, various types of additives, as is commonly practiced in the art, may be employed in the inks to optimize the properties of the ink compositions for specific applications.

EXAMPLES

Inks were formulated and different qualities of the formulated inks were measured in an effort to assess the benefits attained in the practice of the invention, namely, the effect of pH and buffer (e.g., MOPS or Trizma Base) on stability of inks containing dyes with protonation sites, in particular dyes of Formula I or II in the presence of precipitating agents, and buffer.

The inks comprised an aqueous solvent, Dye of Formula II, and $MgNO_3$ (as the precipitating agent). The pH of the inks were adjusted, as necessary with either NaOH or $HNO_3$.

Example 1

Several ink samples containing the above composition were aged for several days. The inks differed from one another in their initial pH (pH of the inks was adjusted to the desired level as necessary). The pH of the inks was measured as the samples aged and plotted as illustrated in FIG. 1. As can be noted from the data in FIG. 1, inks formulated at lower pH levels (e.g., lower than 6) increased in their pH as they aged indicating a reduction in the concentration of hydrogen. Without limiting the scope of the invention, the inventors believe that this is a result of the dye being protonated thereby reducing the content of free $H^+$ (or $H_3O^+$). The increase in pH corresponded with precipitation (or the start of precipitation) of the dye. In contrast, inks formulated at higher initial pH levels remained substantially unchanged in their pH levels.

Example 2

Two samples were formulated, one with vehicle (and ingredients other than dye) only (VEHICLE) and the other further containing the dye (INK).

Figure 2:
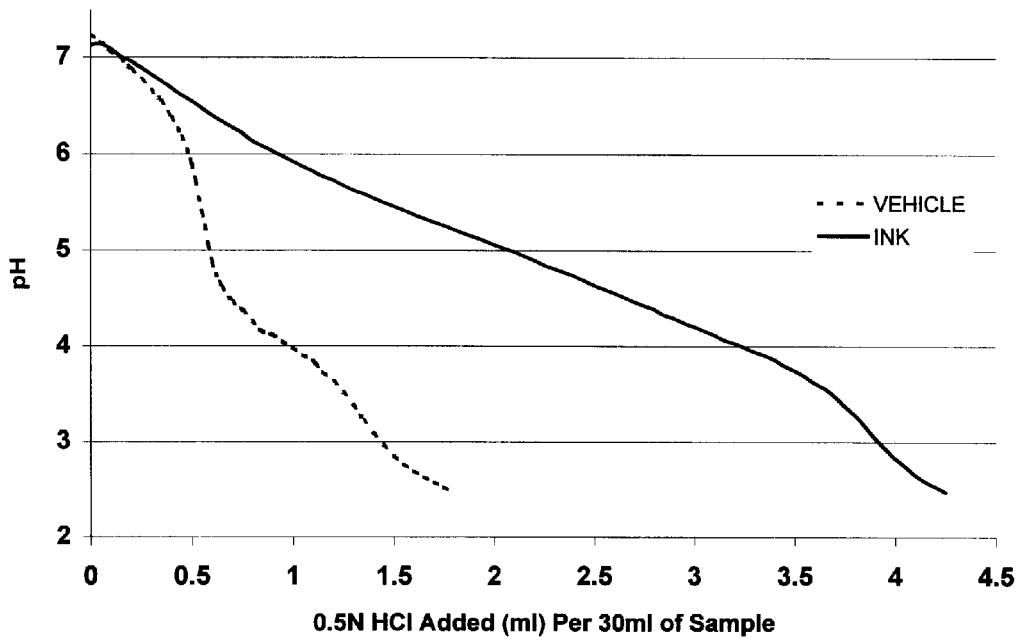
FIG. 2 is a plot of ink pH versus amount of acid added to the sample indicating significant buffering capacity of the dyes of the present invention.

The samples were titrated with HCL and the results were plotted in FIG. 2. As can be seen from the data in FIG. 2, the titration curve for the VEHICLE sample had a steeper slope than the INK sample. Without limiting the scope of the invention, the inventors believe that this data indicates the buffer capacity of the dye and that as $H^+$ (from the acid) is added to the ink, the dye becomes protonated thus reducing the slope of the curve.

Example 3

Figure 3:
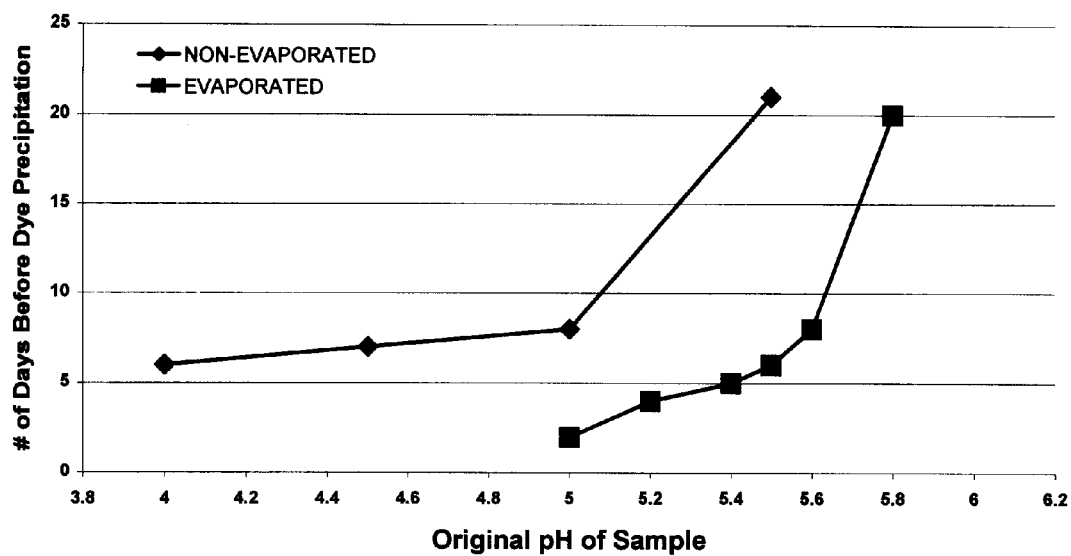
FIG. 3 is a plot showing relationship between the ink initial pH and number of days necessary to start precipitation of the dye from liquid phase. The plot also indicates reduced stability of the partially evaporated ink at lower pH.

Ink-jet inks, in their intended environment, are susceptible to evaporation which in turn has an effect on the performance of the printhead delivering the ink. To evaluate the performance o f the inks as they are exposed to evaporation conditions, two groups of inks were prepared. The composition of one of the two groups, was adjusted to reflect a 30% evaporation of the vehicle (EVAPORATED). The initial pH of inks within each group was then adjusted as necessary to the desired levels. The samples were then monitored for signs of precipitation and the number of days before the start of visible precipitation was plotted against the initial pH of the inks, as reported in FIG. 3. As can be seen from FIG. 3, evaporated inks had less stability margin at lower pH than the inks with higher water content (non-evaporated inks). Without limiting the scope of the invention, the inventors believe that this data indicates the sensitivity of the dyes to precipitation as the vehicle composition changes, thus the need for more robust formulations.

Thus, the experiments indicated the need for buffering inks containing dyes of Formula I or II with a buffer, according to the present invention, to minimize unwanted precipitation, thus more reliable performance.

What is claimed is:
1. An aqueous ink-jet ink comprising:
   at least one anionic dye having at least one basic nitrogen atom functioning as a protonation site;
   at least one buffering agent in sufficient quantity to maintain the pH of the ink at a range from about 5.5 to about 9.5; and
   at least one multi-valent metal cation.
2. The ink of claim 1 wherein the at least one dye has formula I

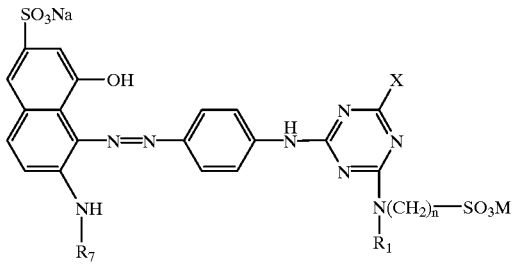

Wherein
$R_1$ is selected from hydrogen or an aliphatic radical having from 1 to 6 atoms;
n is 2, 3, or 4;
X is $NR_3R_4$ where
   $R_3$ and $R_4$ are independently selected from hydrogen; alkyl from 1 to 6 C atoms; C2 to C6 substituted alkyl where the substituents are selected from O, OCH3, COOM, SO3M; aralkyls; unsubstituted aryl or an aryl substituted by COOM or SO3M;
   $R_3$ and $R_4$ may form a ring without or with inclusion of a hetero atom; or
X is $SR_5$ in which $R_5$ is alkyl from 1 to 6 atoms; C2 to C6 substituted alkyl where the substituents are selected from OH, OCH3, COOM, SO3M; or
X is $OR_4$ in which $R_6$ is hydrogen or an aliphatic radical having from 1 to 6 C atoms;
$R_7$ is hydrogen, alkyl of 1 to 6 C atoms; C2 to C6 substituted alkyl where the substituents are selected from CN, COOM, OH, $COOCH_3$, $COOCH_2CH_3$, $COCH_3$; unsubstituted aryl or aryl substituted by $CH_3$ or halogen;
M is hydrogen, a metal atom; an ammonium or ammonium substituted with alkyl, alkoxyalkyl or hydroxyl alkyl each having 1 to 12 C atoms.
3. The ink of claim 1 wherein the at least one dye has formula II

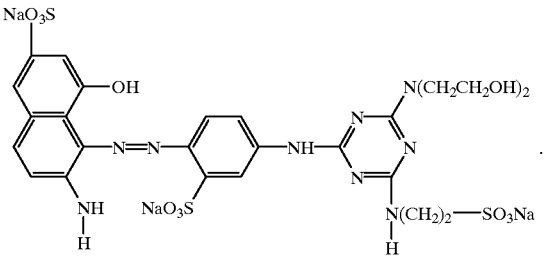

4. The ink of claim 1, 2, or 3 wherein the at least one buffer is present in sufficient quantity to maintain the pH of the ink at a range from about 6 to about 9.
5. The ink of claim 4 wherein the at least one buffer is present in sufficient quantity to maintain the pH of the ink at a range from about 6.5 to about 8.5.
6. The ink of claim 1, 2, or 3 wherein the at least one buffer is selected from the group consisting of Tris (hydroxymethyl)aminomethane, 3-(N)-morpholino) propanesulfonic acid, N-Tris(hydroxymethyl)-2-aminoethanesulfonic acid, 3-(N,n-bis-2-hydroxyethylamino)-2-hydroxypreponesulfonic acid, 3-(N-trishydroxymethylmethylamino)-2-hydroxypropanesulfonic acid, N-(2-hydroxyethyl)piperazine-N'-(2-hydroxypropanesulfonic acid), N-Tris(hydroxymethyl)methylglycine, N,N-Bis(2-hydroxyethyl)glycine, N-Tris(hydroxymethyl)methyl-3-aminopropanesulfonic acid, and 3-(1,1-Dimethyl-2-hydroxyethylamino)-2-hydroxypropanesulfonic acid.

7. The ink of claim 6 further wherein the at least one buffer is Tris(hydroxymethyl)aminomethane.

8. The ink of claim 1, 2, or 3 wherein the at least one precipitating agent is a multi-valent metal compound.

9. The ink of claim 8 wherein the multi-valent metal compound is a metal salt or metal coordination compound.

10. The ink of claim 9 wherein the multi-valent metal compound is a metal salt.

* * * * *